United States Patent [19]
Sohgawa et al.

[11] Patent Number: 5,494,467
[45] Date of Patent: Feb. 27, 1996

[54] EXHAUST SYSTEM FOR OUTBOARD MOTOR

[75] Inventors: Masafumi Sohgawa; Atsushi Isogawa; Hiroaki Fujimoto, all of Hamamatsu, Japan

[73] Assignee: Yamaha Motor Co., Ltd., Iwata, Japan

[21] Appl. No.: 154,304

[22] Filed: Nov. 18, 1993

[30] Foreign Application Priority Data

Nov. 18, 1992 [JP] Japan .................................. 4-332436

[51] Int. Cl.⁶ .......................................... B63H 21/32
[52] U.S. Cl. .................................................. 440/89
[58] Field of Search ........................................ 440/88, 89

[56] References Cited

U.S. PATENT DOCUMENTS

| | | | |
|---|---|---|---|
| 5,212,949 | 5/1993 | Shiozawa | 440/89 |
| 5,280,708 | 1/1994 | Sougawa et al. | 440/89 |
| 5,306,185 | 4/1994 | Lassanske et al. | 440/89 |
| 5,326,295 | 7/1994 | Nakayama | 440/89 |

FOREIGN PATENT DOCUMENTS 62-28288   6/1987   Japan .

OTHER PUBLICATIONS

Summary Sheet of Japanese 2–147101 dated Jun. 5, 1990.

*Primary Examiner*—Stephen P. Avila
*Attorney, Agent, or Firm*—Knobbe, Martens, Olson & Bear

[57] ABSTRACT

A number of embodiments of exhaust systems for outboard motors wherein the exhaust ports of the engine discharge the exhaust gases to the atmosphere through an underwater high speed exhaust gas discharge. A trap device is provided for precluding the water from the underwater exhaust gas discharge entering the engine through its exhaust ports. This trap device includes a section that extends above the highest exhaust port of the engine for this purpose.

40 Claims, 14 Drawing Sheets

EXHAUST SYSTEM FOR OUTBOARD MOTOR

BACKGROUND OF THE INVENTION

This invention relates to an exhaust system for an outboard motor and more particularly to an improved exhaust system that will ensure against water inadvertently being drawn into the engine through its exhaust system.

Conventionally, outboard motors employ exhaust systems that convey the exhaust gases from the engine to an expansion chamber and silencing system positioned in the drive shaft housing through exhaust pipes that depend from the power head into the expansion chamber. The exhaust gases are then discharged to the atmosphere from this expansion chamber through a high speed below the water exhaust gas discharge. In addition, a restricted above the water exhaust gas discharge is provided for the discharge of exhaust gases when the watercraft is relatively stationary and the underwater exhaust gas discharge is so deeply submerged that the low pressure of the exhaust gases cannot exit through this path.

Although this type of system is generally effective, for tuning and silencing purposes, it is necessary for the exhaust pipe or exhaust pipes to depend some distance into the expansion chamber. Normally, these exhaust pipes terminate at an area in the expansion chamber just slightly above the water level therein when the watercraft is stationary. It should be readily apparent that due to the underwater exhaust gas-discharge, water will enter the expansion chamber through the exhaust system.

It is also well known, however, that the exhaust pulses of an engine, particularly a two-cycle engine, tend to have periods when the exhaust pressure is less than atmospheric. Thus, there is a danger that water in the expansion chamber can be drawn into the engine through the exhaust system. Furthermore, there are instances where the water level can be higher than the normal stationary water level. For example, when decelerating abruptly, the water level can rise significantly and this can cause a possibility of water entering the engine through its exhaust system. In addition, when the outboard motor is tilted up to an out of the water position, residual water in the expansion chamber can at times flow back to the exhaust pipes and enter the engine. Of course, none of these effects is desirable.

It is, therefore, a principal object of this invention to provide an improved exhaust system for an outboard motor.

It is another object of this invention to provide an exhaust system for an outboard motor that can in a convenient and simple way ensure against the entry of water into the engine through its exhaust system.

In conjunction with multiple cylinder engines, it is the practice to employ an exhaust manifold for each bank of cylinders and thus a number of exhaust ports discharge into this manifold. Of course, this means that the lowermost cylinders are more prone to receiving water through the exhaust system under the extreme conditions noted above.

It is, therefore, a still further object of this invention to provide an improved exhaust system for a multiple cylinder engine of an outboard motor.

SUMMARY OF THE INVENTION

This invention is adapted to be embodied in an outboard motor that is comprised of a power head having an internal combustion engine having at least one exhaust port and a surrounding protective cowling. A drive shaft housing and lower unit depends from the power head and contains a propulsion device driven by the engine for propelling an associated watercraft. An underwater exhaust gas discharge is provided in the drive shaft housing and lower unit for discharging exhaust gases from the engine to the atmosphere through the body of water in which the watercraft is operating. Means are provided for delivering exhaust gases to the underwater exhaust gas discharge from the exhaust port. In accordance with the invention, this conduit means includes a section that extends vertically above the highest exhaust port of the engine for forming a trap to preclude water from entry into the exhaust port from the underwater exhaust gas discharge.

DETAILED DESCRIPTION OF THE PREFERRED EMBODIMENTS OF THE INVENTION

Figure 1:
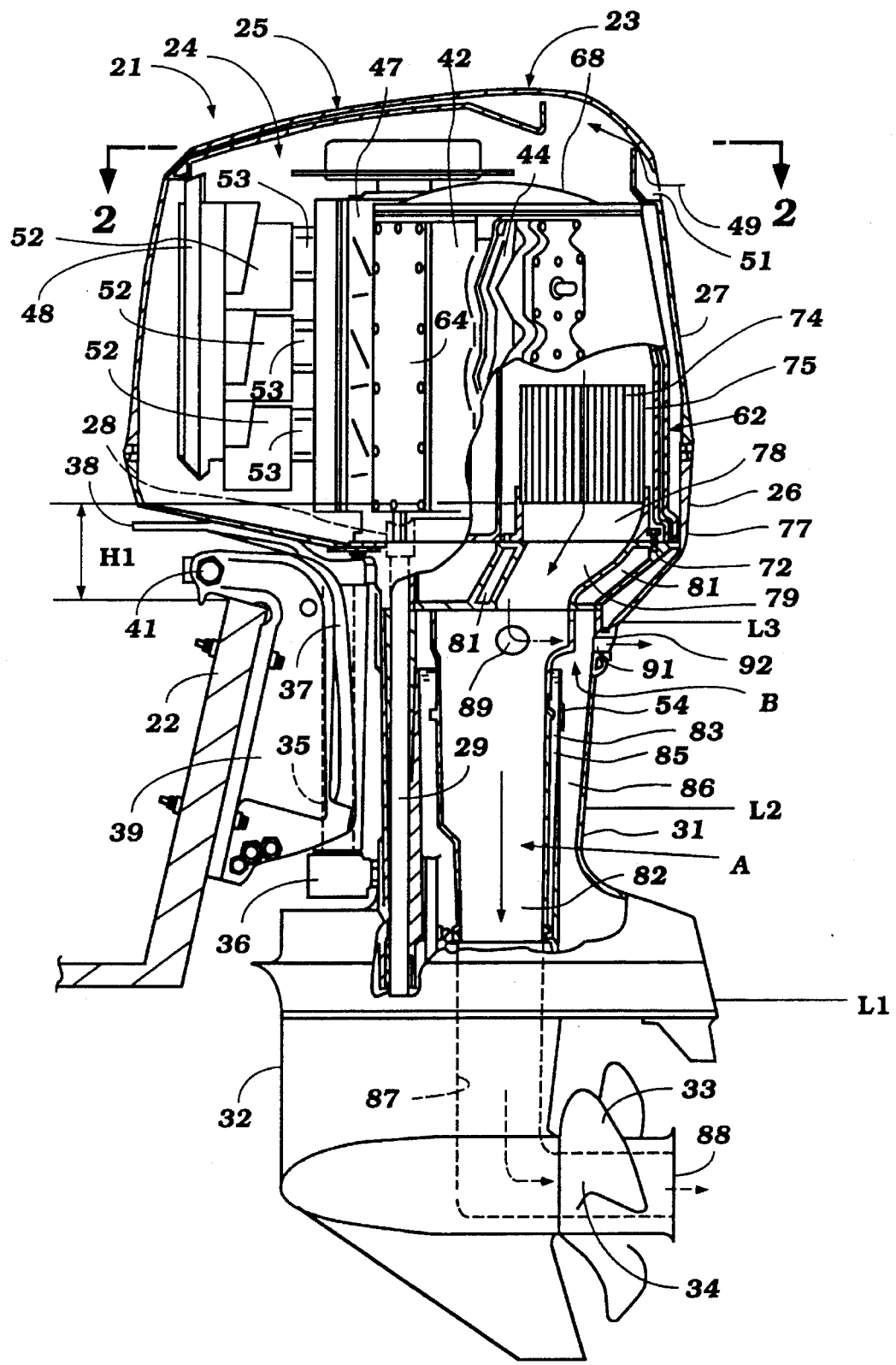
FIG. 1 is a side elevational view of an outboard motor constructed in accordance with a first embodiment of the invention, which portion is broken away and other portions shown in section. The outboard motor is shown as being attached to the transom of an associated watercraft, which is shown partially and in cross section.
Figure 2:
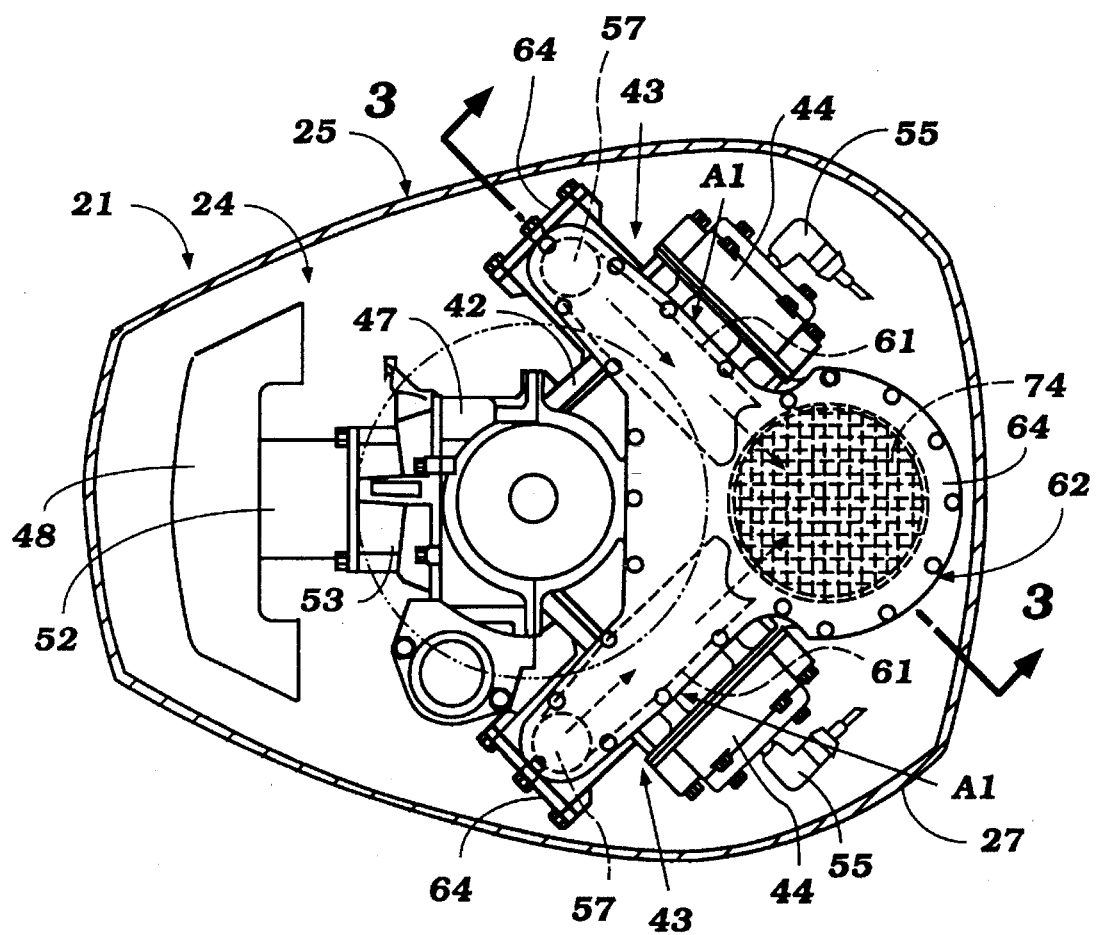
FIG. 2 is a cross-sectional view taken along the line 2—2 of FIG. 1.
Figure 3:
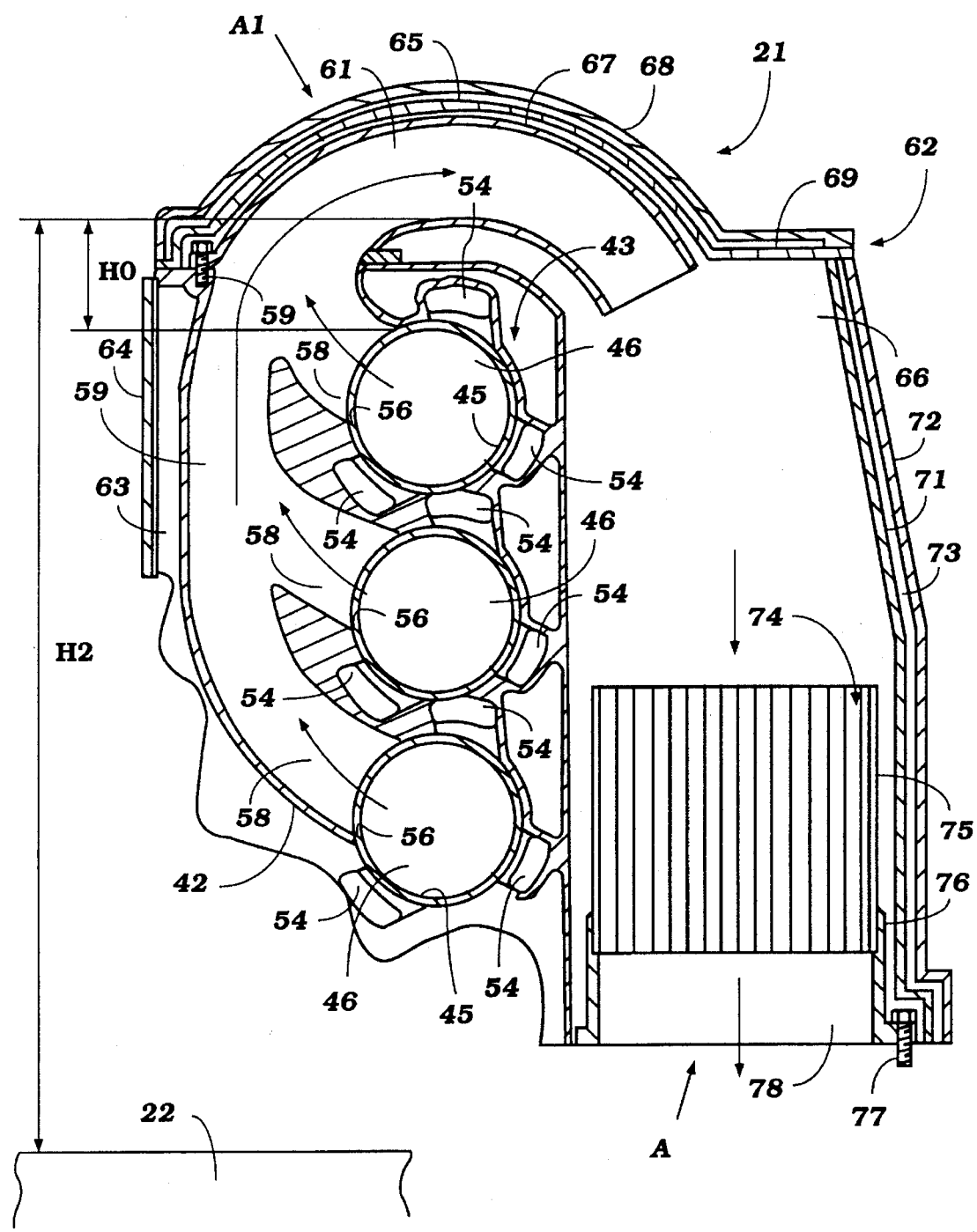
FIG. 3 is an enlarged cross-sectional view taken along the line 3—3 of FIG. 2.

Referring now in detail to the drawings and initially to the embodiment of FIGS. 1–3, an outboard motor constructed in accordance with this embodiment of the invention is identified generally by the reference numeral 21 and is shown as attached to the transom 22 of an associated watercraft.

The outboard motor 21 is comprised of a power head, indicated generally by the reference numeral 23 and which is comprised of a powering internal combustion engine 24 and a surrounding protective cowling, indicated generally by the reference numeral 25. The protective cowling 25 is comprised of a lower tray portion 26 which is formed normally of a lightweight material such as an aluminum or aluminum alloy casting. The cowling 24 is completed by a main cover portion 27 formed from a material such as a molded fiberglass reinforced plastic or the like and which is detachably connected to the tray 26 in a well known manner.

The construction of the engine 24 will be described in more detail later but, as is typical with outboard motor practice, the engine 24 is supported within the power head 23 so that its crankshaft 28 rotates about a vertically extending axis. This output shaft 28 is coupled to a vertically extending drive shaft 29 that is journalled within a drive shaft housing lower unit assembly that is comprised of a drive shaft housing 31 and lower unit 32. In the lower unit 32 is positioned a forward neutral reverse transmission (not shown) of a conventional type which drives a propeller 33 having a hub portion 34 that is affixed for rotation with a propeller shaft (not shown) selectively driven by this transmission.

A steering shaft 35 is affixed to the drive shaft housing 31 by means of a lower bracket 36 and an upper bracket (not shown). This steering shaft is supported for pivotal movement about a vertically extending steering axis formed by a swivel bracket 37. A tiller 38 is affixed to the upper end of the steering shaft 35 for steering of the outboard motor 21 in a well known manner.

The swivel bracket 37 is, in turn, pivotally connected to a clamping bracket 39 by a tilt pin 41 for tilt and trim movement of the outboard motor 21 about the axis defined by the pivot pin 41 in a well known manner.

The construction of the outboard motor 21 as thus far described may be considered to be conventional and, for that reason, further details of its construction are not believed to be necessary to permit those skilled in the art to practice the invention.

The engine 24 in this embodiment is of the V6 type and operates on a two stroke crankcase compression principle. As will become apparent and certain embodiments are described that depict how the invention can be applied with in-line type of engines. It should be obvious to those skilled in the art from the following description how this is possible, regardless of the number of cylinders or cylinder orientation.

The engine 25 includes a cylinder block 42 having a pair of cylinder banks 43 which are disposed at an acute angle to each other with cylinder heads 44 being affixed to the cylinder banks of the cylinder block 42 so as to define a valley therebetween. In the embodiments described, the cylinder banks 43 extend rearwardly from the engine output shaft 28.

Although the internal detail of the engine is not an important feature of the invention, the invention relating primarily to the exhaust system for the outboard motor 21, a portion of the internal construction will be described by particular reference to FIG. 3 which is a cross-sectional view taken through one of the cylinder banks 43. It will be seen in this figure that each cylinder bank 43 is comprised of three vertically spaced cylinder bores 45 which are formed by pressed or cast-in liners in which pistons 46 reciprocate. These pistons 46 are connected by connecting rods (not shown) to the crankshaft 18. The crankshaft 18 is, in turn, rotatably supported within a crankcase chamber defined by the skirt of the cylinder block 42 and a crankcase member 47 (FIGS. 1 and 2) that is affixed to the cylinder block 42 in a well known manner. As is typical with two cycle crankcase compression engines, the crankcase chambers associated with each of the cylinder bores 46 are sealed from each other.

An intake charge is delivered to the crankcase chambers thus formed by an induction system that includes an air inlet device 48 which draws air through one or more inlet openings (not shown) from within the protective cowling 25. Air enters the interior of the protective cowling through a rearwardly facing atmospheric air inlet opening 49 formed by a slot and baffling 51 formed by the main cover member 27 of the protective cowling 25.

The air thus drawn through the air inlet device 45, 48 is transferred to a plurality of charge formers 52, in the illustrated embodiment, these charge formers 52 include three dual-throat side draft carburetors. It is to be understood, however, that other forms of charge formers may be employed such as fuel injectors or the like. These fuel injectors may inject into the induction system as thus far described or the invention may be employed in conjunction with direct cylinder fuel injection. Again, since the invention deals primarily with the exhaust system, any details of the engine 25 which are not described may be considered to be of any conventional type.

The charge thus formed is transferred from the charge formers or carburetors 52 to the crankcase chamber through intake manifolds 53 in which reed-type check valves (not shown) are positioned so as to permit a flow of charge into the crankcase chamber when the pistons 46 are moving upwardly but to preclude reverse flow when the pistons are moving downwardly to compress the charge in the crankcase chamber.

Referring again to FIG. 3, there is provided a scavenging system for transferring the compressed charge from the crankcase chamber to the combustion chambers formed by the pistons 46, cylinder bores 45, and cylinder heads 44. In the illustrated embodiment, this scavenge system includes three circumferentially spaced scavenge passages 54 that extend from the crankcase chambers to scavenge ports formed in the cylinder liners and cylinder bores 45. The intake charge is then fired by means of spark plugs 55 mounted in the cylinder heads 44 and which are ignited by any suitable ignition system.

As the charge expands and drives the pistons 46 downwardly, exhaust ports 56 formed in the cylinder liner will open and the exhaust gases can exit through an exhaust manifold, indicated generally by the reference numeral 57 which is formed in part integrally within the cylinder block 42. This exhaust manifold 57 includes a plurality of runner sections 58 which extend from the respective exhaust ports 56 to a common collector section. In accordance with a future of the invention, this collector section terminates in an outlet opening 59 formed in the upper end of the cylinder block 42. This outlet opening is disposed above each of the exhaust ports 56 for a reason now to be described.

A trap forming section, indicated generally by the character A1 is provided at the upper end of each cylinder bank 43 and this is comprised of a trap section 61 which extends upwardly from the opening 59, horizontally in a rearwardly extending direction across the upper ends of the cylinder banks 43 and to an expansion chamber 62 formed in the valley between the cylinder banks 43. This trap section 61 has the lowest part of its horizontally extending section disposed at a distance HO above the uppermost exhaust port 56 and at a substantial distance H2 above the transom 22 of the associated watercraft. This high elevation and trap-like configuration will ensure that water cannot enter the exhaust ports 56 from the remainder of the exhaust system which will be described.

It will be noted that in this embodiment of the invention, the exhaust ports 56 are positioned on the outside of the cylinder banks 43. Because of this configuration, there will be a large area open between the cylinder banks 43 in which the expansion chamber 62 may be positioned so as to provide a very compact assembly, as is important with outboard motors.

The engine 24 is water cooled and water for its cooling is drawn from the body of water in which the watercraft operates in a known manner by a water pump (not shown) disposed at the interface between the drive shaft housing 31 and the lower unit 32 and which is driven from the drive shaft 29 in a known manner. The cooling jacket of the engine appears in part in certain figures but since this feature forms no part of the invention, a detailed description of it is not believed to be necessary. However, it should be noted that cooling jackets 63 are formed on the outer sides of the exhaust manifold 57 by means of cover plates 64 that are removably attached thereto for servicing and cleaning purposes. The engine coolant is also circulated through these cooling jackets 63 so as to provide cooling for the exhaust gases which assist in the silencing and which also will ensure that the temperature of the power head 23 will not be too high.

The trap section 61 is enclosed by a further cover plate 65 which also forms the upper wall of an expansion chamber volume 66 formed by the expansion chamber 62. An air gap 67 is formed between the cover plate 67 and the trap section 61 so as to provide some insulation so that the exhaust gases will not be cooled excessively. This is to insure good operation of the catalyst which will be described. A further cover plate 68 overlies the cover plate 67 and forms a cooling jacket 69 through which engine coolant may be circulated, if desired.

The expansion chamber volumn 66 is formed by an inner shell 71 which is affixed suitably to the engine and to a spacer plate 72 (FIG. 1) upon which the engine 24 is supported. An outer shell 72 encloses the inner shell 71 and defines a further cooling jacket 73 through which coolant may be circulated. The expansion chamber volumn 66 serves the purpose of silencing the exhaust gases and thus further improve the efficiency of the engine and also forming a further chamber which will ensure against water being able to enter the engine through the exhaust port 56 in combination with the trap-like device A1.

In accordance with another feature of the invention, a catalyst bed 74 of a suitable type is contained within the expansion chamber 66 and will treat the exhaust gases to remove harmful constituents. The catalyst bed 74 has an outer shell 75 that is detachably supported within a collar or sleeve 76 that is affixed to the spacer plate 72 by threaded fasteners 77. As a result of this construction, the catalyst bed may be easily serviced by removing the cover plate 68 and withdrawing the catalyst bed 74.

The exhaust gases which have flown through the trap section A1, expansion chamber 62 and catalyst bed 74 are discharged downwardly into the drive shaft housing 31 through an exhaust passage 78 formed by the sleeve 76. The exhaust passage 78 from the power head 23 communicates with a further exhaust gas passage 79 formed in the spacer plate 72. This passage 79 is surrounded by a cooling jacket 81 through which water is circulated from the cooling jackets thus far described in any known manner.

The exhaust gases that pass through the spacer plate passage 79 enter an expansion chamber 82 formed within the drive shaft housing 31 by means of an inner shell 83. An outer shell 84 forms a water jacket 85 around this inner shell 83 and water from the cooling jacket of the engine is delivered thereto so as to maintain a level of water therearound. This water flows over a weir-like section into a further chamber 86 formed in the drive shaft housing from which the coolant is drained back to the body of water in which the watercraft is operating.

The expansion chamber 66, catalyst bed 74, discharge passageway 78, spacer plate passageway 79, and expansion chamber 82 all form an exhaust discharge passage A that communicates with an underwater exhaust gas discharge passage 87 formed in the lower unit 32 which cooperates with an underwater exhaust gas discharge, in this case through the hub discharge 88 for discharge of the exhaust gases to the atmosphere through the body of water in which the watercraft is operating. It should be noted that when the watercraft with which the outboard motor 21 is associated is operating in a planing condition, the water level will be as indicated at the line L1 in FIG. 1 and hence the through the hub discharge 88 will be relatively shallow and the exhaust gas pressure is sufficient to permit the exhaust gases to be discharged through this path.

When the watercraft is traveling at a low speed or idling, however, the hull and outboard motor 21 will sink into the water to a water level L2 wherein the expansion chamber 82 is much deeper in the water and through the hub discharge 88 is very deeply submerged. Therefore, it is necessary to provide an above the water exhaust gas discharge so that the exhaust gases can be discharged in this condition.

The underwater exhaust gas discharge includes one or more passages 89 formed in the inner shell 83 which defines the expansion chamber 82 and which communicates with a volume B formed by the interior of the drive shaft housing 31. An above the water exhaust gas discharge 91 is formed by a sleeve-like member 92 which is fixed into the drive shaft housing through which exhaust gases may be discharged under this running condition.

It should be noted that during abrupt deceleration, the water level may reach the line L3 which is above this above the water exhaust gas discharge 91. However, any water that enters the drive shaft housing 31 in this condition will enter the cavity 86 not the expansion chamber 82 so that it can be easily drained. Also, even though the expansion chamber 82 may receive water to this high level, there is no exhaust pipe that depends into this expansion chamber as with the prior art type of constructions. Hence negative exhaust gas pulses cannot cause water to be drawn upwardly from the expansion chamber 82. If there was any tendency for the exhaust gases to be drawn upwardly the trap-like section A1 will ensure that the water is not drawn back into the exhaust port 56 due to its very high elevation above the transom.

FIGS. 4–7 each show different embodiments which are generally the same as the embodiment of FIGS. 1–3. These embodiments differ from each other only in the way in which the expansion chamber is formed and how the catalyst bed is disposed in the exhaust system. For that reason, components of these embodiments which are the same as the previously described embodiments have been identified by the same reference numerals and will not be described again, except insofar as is necessary to understand the construction and operation of these embodiments.

The trap section A1 and remainder of the exhaust system is substantially the same and, for that reason, only the expansion chamber, catalyst bed location and drive shaft housing expansion chamber will be described in these embodiments.

In each of these embodiments, an expansion chamber 101 is formed by an expansion chamber forming member 102 which has a lower portion 103 that is detachably affixed to a spacer plate 104 having an exhaust passage 105. The trap section 61 extends into the upper end of the expansion chamber 101 and deliver exhaust gases thereto. These exhaust gases then flow downwardly from the exit section 103 and spacer passage 105 into an expansion chamber 106 formed in the drive shaft housing 41 by an expansion chamber forming member 107. A cavity 108 extends therearound which may or may not be filled with water, depending upon what is desired.

Figure 4:
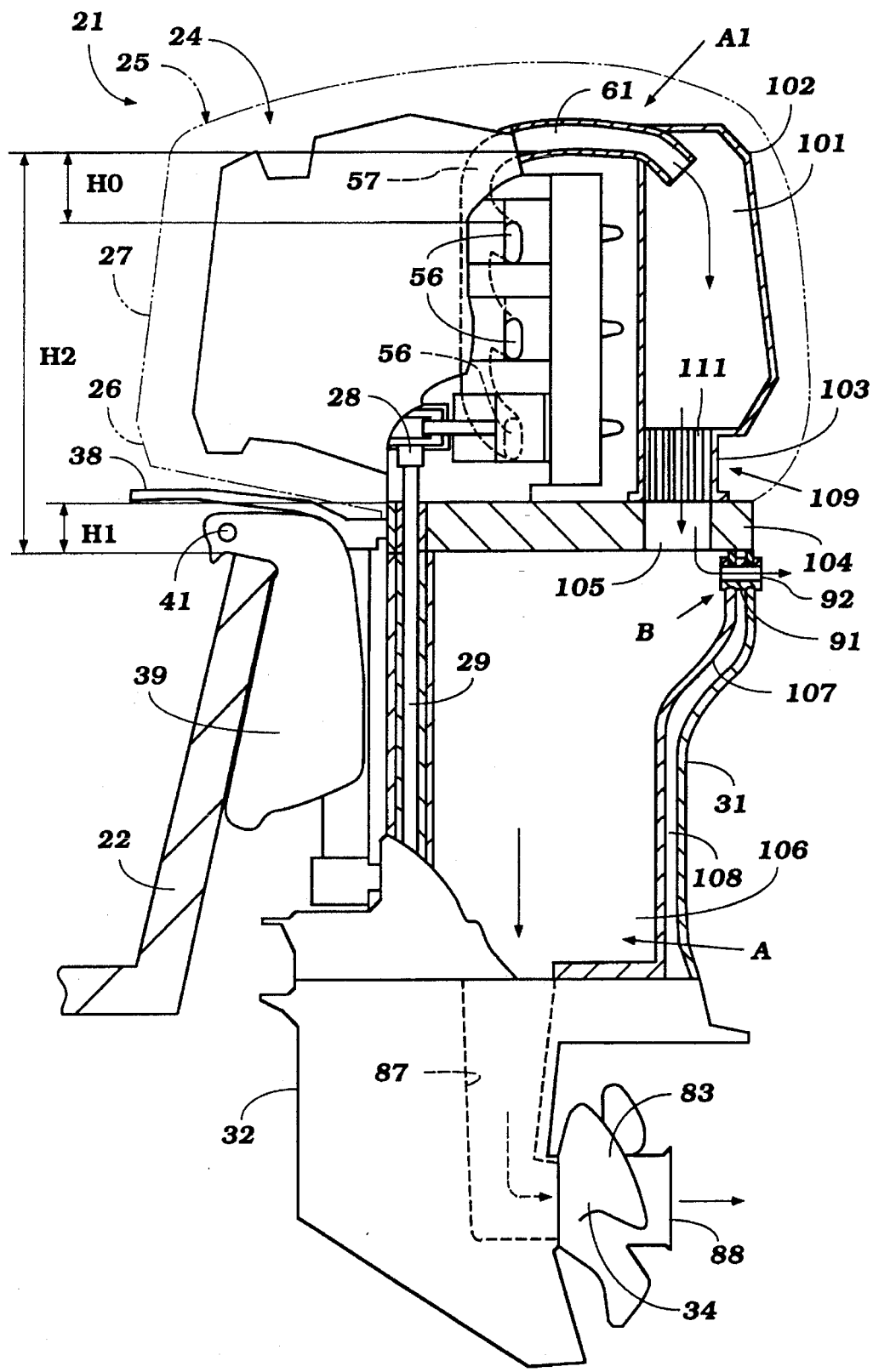
FIG. 4 is a side elevational view, similar to FIG. 1 and shows a second embodiment of the invention.

In the embodiment of FIG. 4, a catalyst bed, indicated generally by the reference numeral 109 has an outer shell and bed portion 111 that is received in the exit section 103. This catalyst bed 101 hence may be conveniently removed and replaced for servicing by removing the outer cowling member 27 and the expansion chamber forming member 102.

The above the water exhaust gas discharge 91 of this embodiment extends directly from the expansion chamber 106 to the exterior through the drive shaft housing 31.

Figure 5:
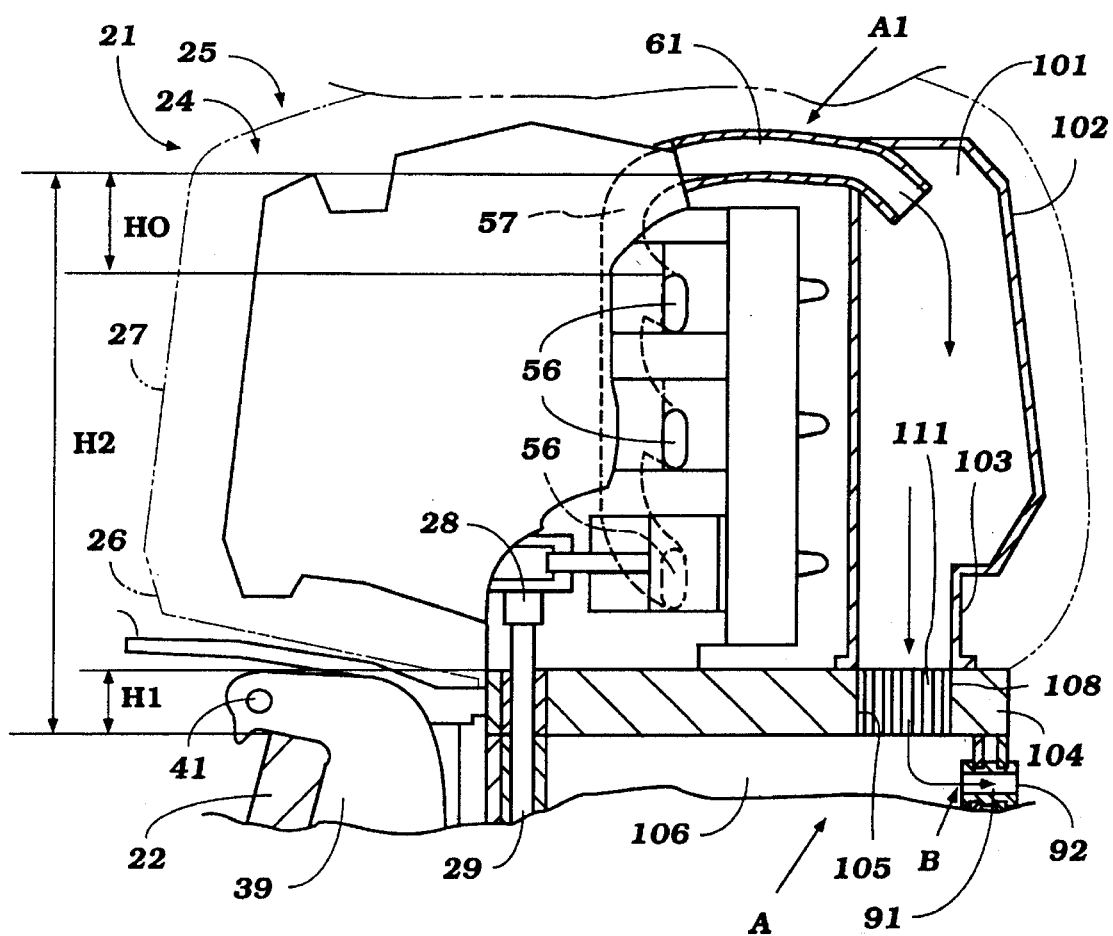
FIG. 5 is a partial side elevational view, in part similar to FIGS. 1 and 4 and shows a third embodiment of the invention.

In the embodiment of FIG. 5, the catalyst bed 108 has its outer shell 111 and bed forming member detachably inserted into the spacer plate opening 105. Thus, like the embodiment of FIG. 4, the catalyst bed may be easily replaced by removing the main cowling member 27 and expansion chamber forming member 102 so as to access the catalyst bed 108.

Figure 6:
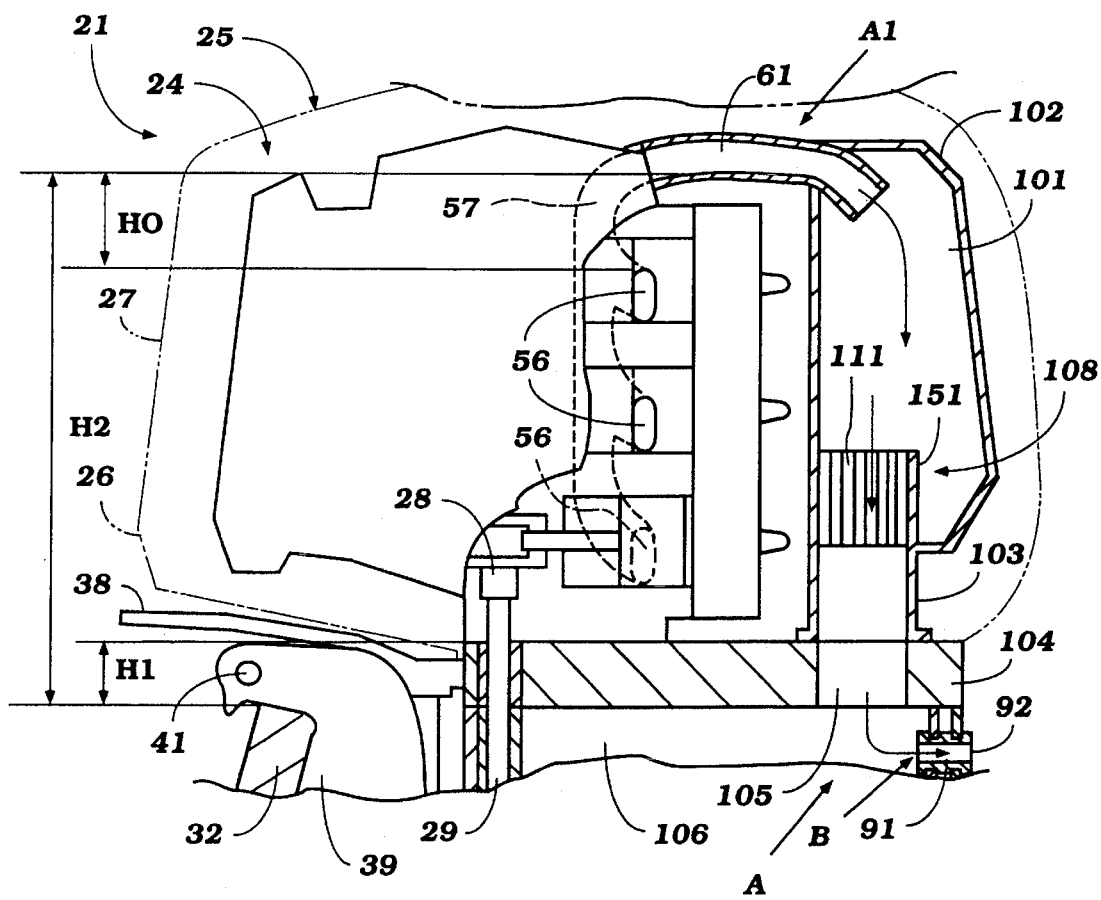
FIG. 6 is a partial side elevational view, in part similar to FIGS. 1, 4 and 5 and shows a fourth embodiment of the invention.

In some instances it may be desirable to position the catalyst bed 108 at a higher level within the expansion chamber 101 and FIG. 6 shows an embodiment how this can be accomplished. In this embodiment, the expansion chamber forming member 102 has, in addition to the discharge section 103 a further section 151 that extends upwardly into the expansion chamber 101 and in which the catalyst bed 108 and specifically its bed portion and outer shell 111 is detachably received. Hence, the catalyst bed may again be easily replaced and accessed for servicing.

Figure 7:
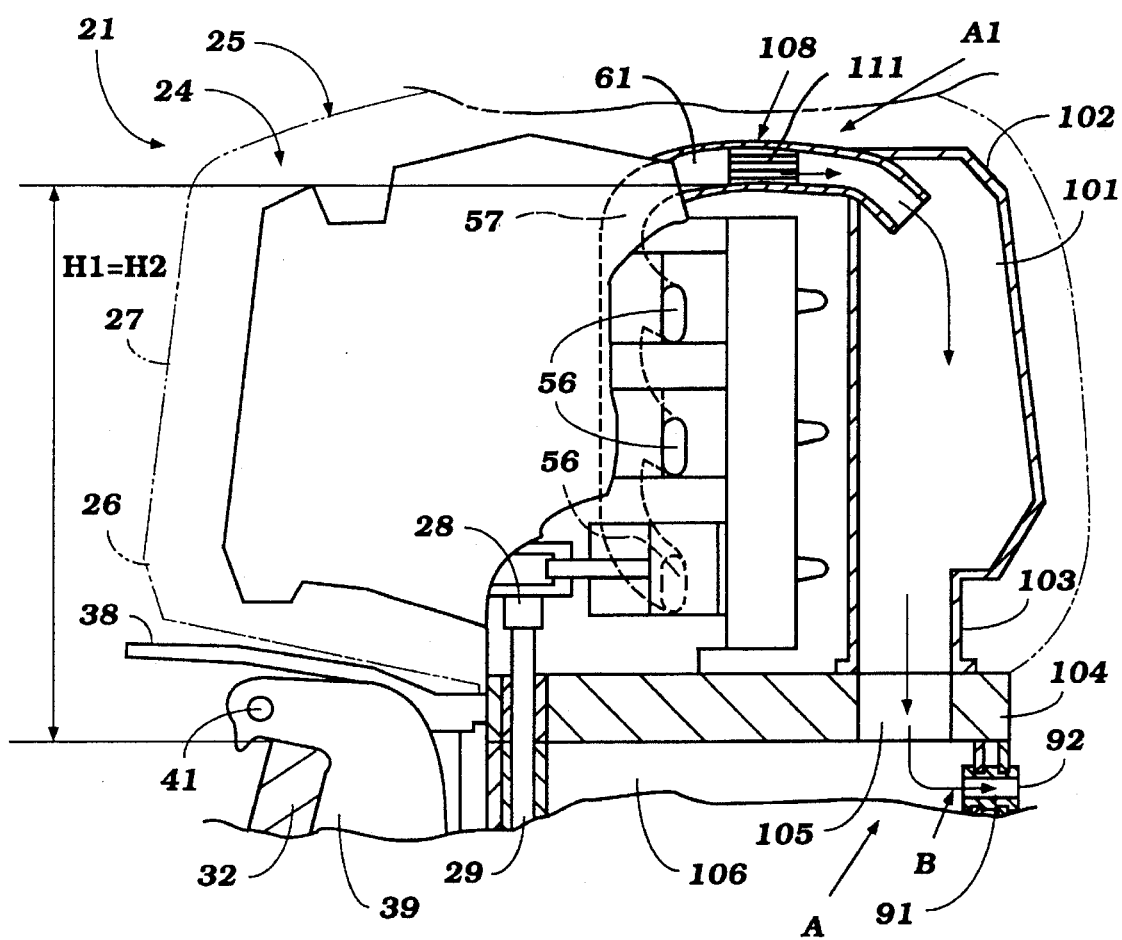
FIG. 7 is a partial side elevational view, in part similar to FIGS. 1, 4, 5, and 6 and shows a fifth embodiment of the invention.

In the embodiment of FIG. 7, the catalyst bed 108 and specifically its shell and bed portion 111 is provided in each of the trap section 61. Again, this bed may be easily replaceable through some form of slip connection. By providing two-catalyst beds as in this embodiment, further ensurement of complete exhaust treatment is possible.

Figure 8:
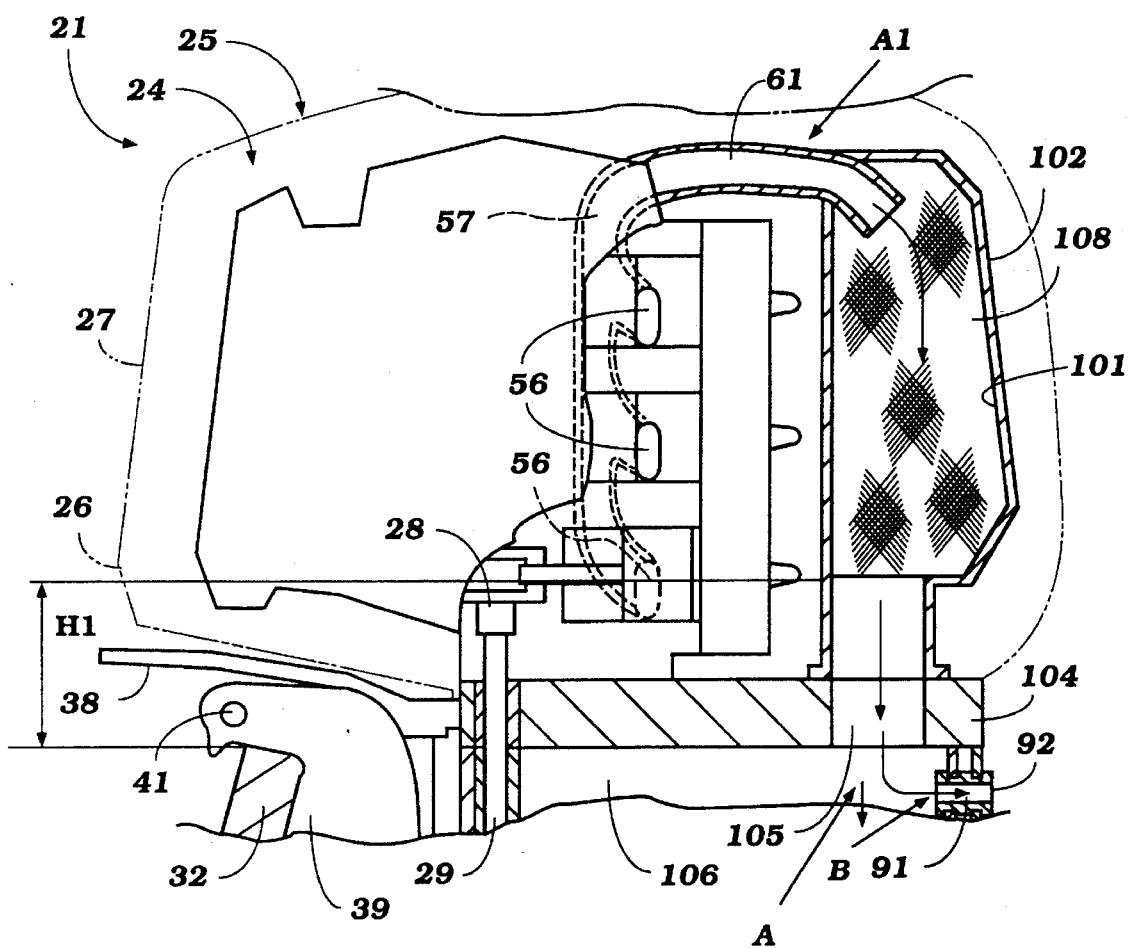
FIG. 8 is a partial side elevational view, in part similar to FIGS. 1, 4, 5, 6, and 7 and shows a sixth embodiment of the invention.

In the embodiment of FIG. 8, a catalyst bed 108 completely fills the expansion chamber 101 and thus provides a very large volume of catalyst for exhaust gas treatment. In this embodiment, the catalyst bed 108 is made relatively porous so as to reduce back pressure while at the same time ensuring full contact of the exhaust gases with the catalyst bed.

Figure 9:
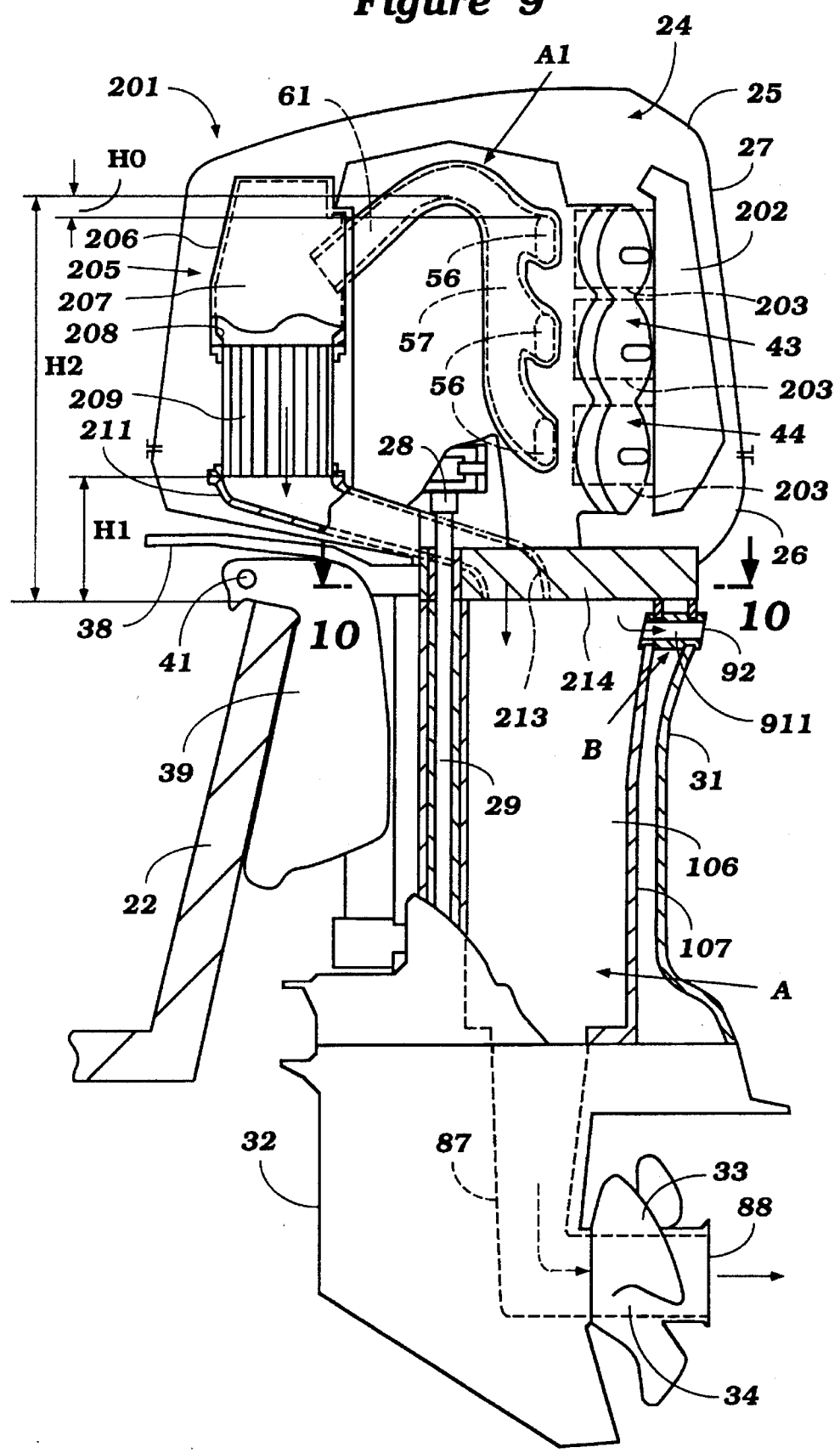
FIG. 9 is a side elevational view, in part similar to FIGS. 1, 4, 5, 6, 7, and 8 and shows a seventh embodiment of the invention.
Figure 10:
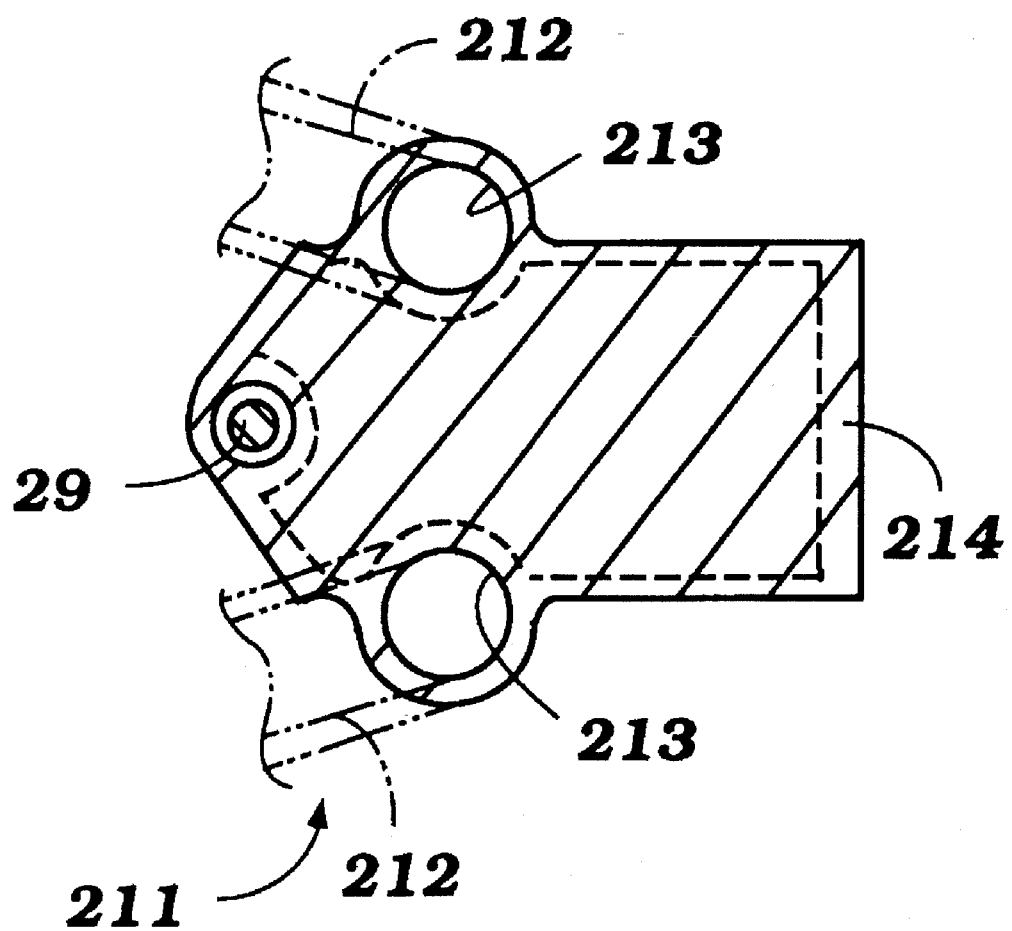
FIG. 10 is a cross-sectional view taken along the line 10—10 of FIG. 9.
Figure 11:
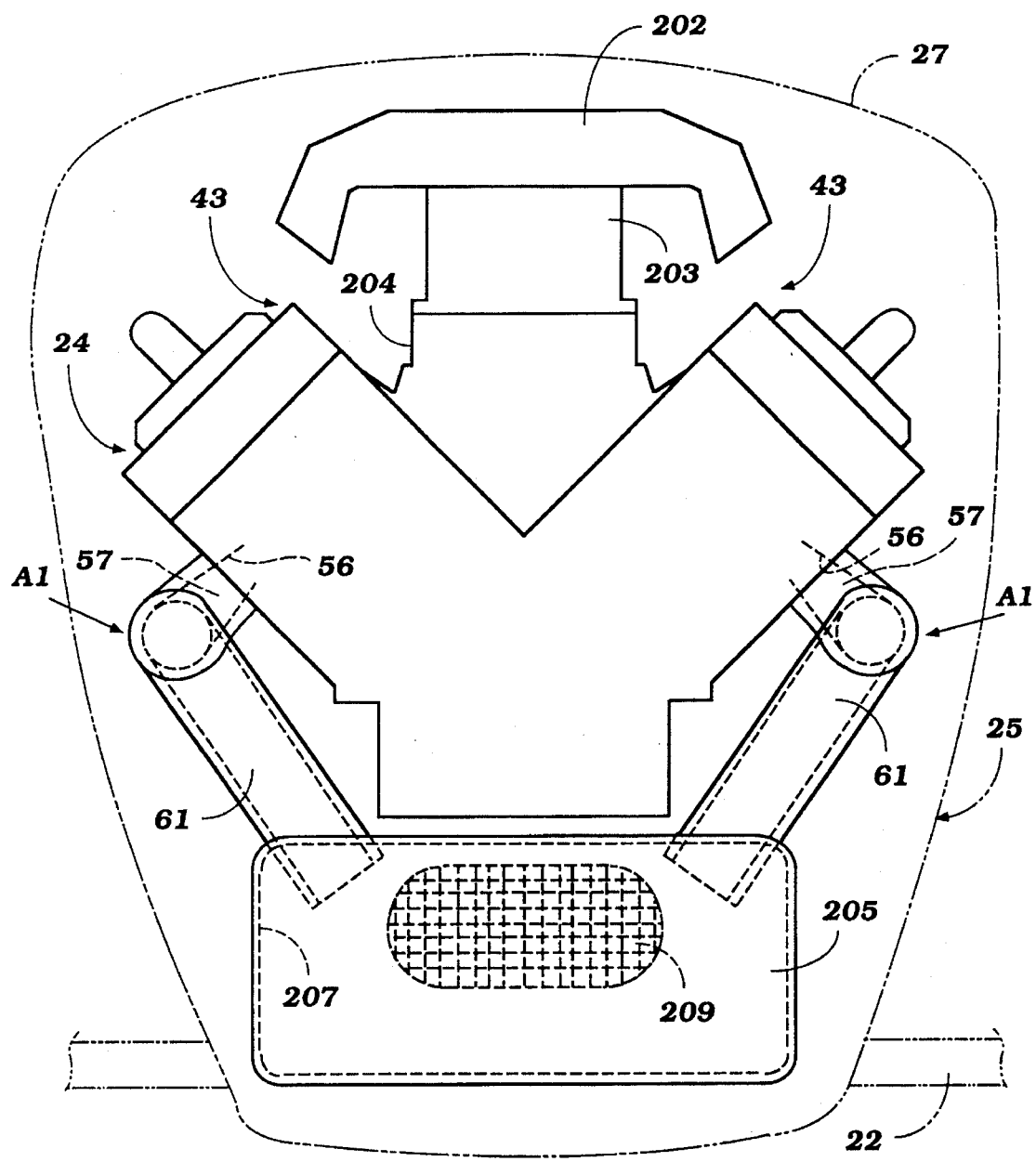
FIG. 11 is a top plan view, on an enlarged scale, of this embodiment with the protective cowling being shown in phantom.

In all of the embodiments as thus far described, the expansion chamber of the power head has been formed to the rear of the engine and in the valley between the banks of the engine. This has been possible due to the use of the outside exhaust ports in the respective cylinder banks. FIGS. 9–11 show an embodiment wherein the expansion chamber is positioned at the forward portion of the power head but in other regards it is the same as the embodiment as thus far described. Where that is the case, portions of the construction which are the same as those previously described have been identified by the same reference numerals and will be described again only insofar as is necessary to understand the construction and operation of this embodiment. This embodiment employs a drive shaft housing expansion chamber like the embodiment of FIGS. 4–8 and hence the reference numerals applied to these components in those figures have been carried over here.

In this embodiment, the induction system for the engine 24 is relocated from the crank case side of the engine to the valley between the cylinder banks 43 as best seen in FIGS. 9 and 11. As before, this induction system includes an air inlet device 202 that draws air from within the protective cowling 25 and transfers it to a plurality of charge formers 203 which, in turn, deliver the charge to the crank case chambers through an intake manifold 204 in which reed-type valve assemblies are provided for the aforenoted purpose.

In this embodiment, the exhaust manifolds 57 again cooperate with trap devices A1 which are formed in part by the sections 61 which extend above the uppermost exhaust port 58 by a distance $H_o$ and then pass downwardly to enter an expansion chamber device, indicated generally by the reference numeral 205 and position at the front of the power head 23. This expansion chamber device 205 is comprised of an upper housing assembly 206 it defines an upper expansion chamber volume 207 to which the exhaust gases are delivered by the trap sections 61.

The lower end of the expansion chambers 207 terminate in a downwardly facing discharge opening 208 that is sealingly engaged with a catalyst bed 209. The catalyst bed 209 has an outer shell so as to direct the exhaust gases downwardly to an exhaust gas receiving member 211 which also has a slip connection with the catalyst bed 209 for its replacement. The exhaust gas receiving section 211 has a pair of branch passages 212 that extend rearwardly and which cooperate with a pair of exhaust gas passages 213 formed in a spacer plate 214. These exhaust passageways 213 then deliver the exhaust gases downwardly into the expansion chamber 106.

Again, it should be apparent from the description of this embodiment that the trap sections A1 are disposed at a high level and will ensure that exhaust gases cannot enter the engine through its exhaust ports 56. In the previously described embodiments, the rearward positioning of the expansion chamber has tended to ensure that water could not flow upwardly from the drive shaft housing into the power head when the outboard motor was tilted up. With the forward placement of these embodiments, there is some possibility that water may flow upwardly but the trap section A1 will ensure that this water cannot enter the engine through its exhaust ports 56.

Figure 12:
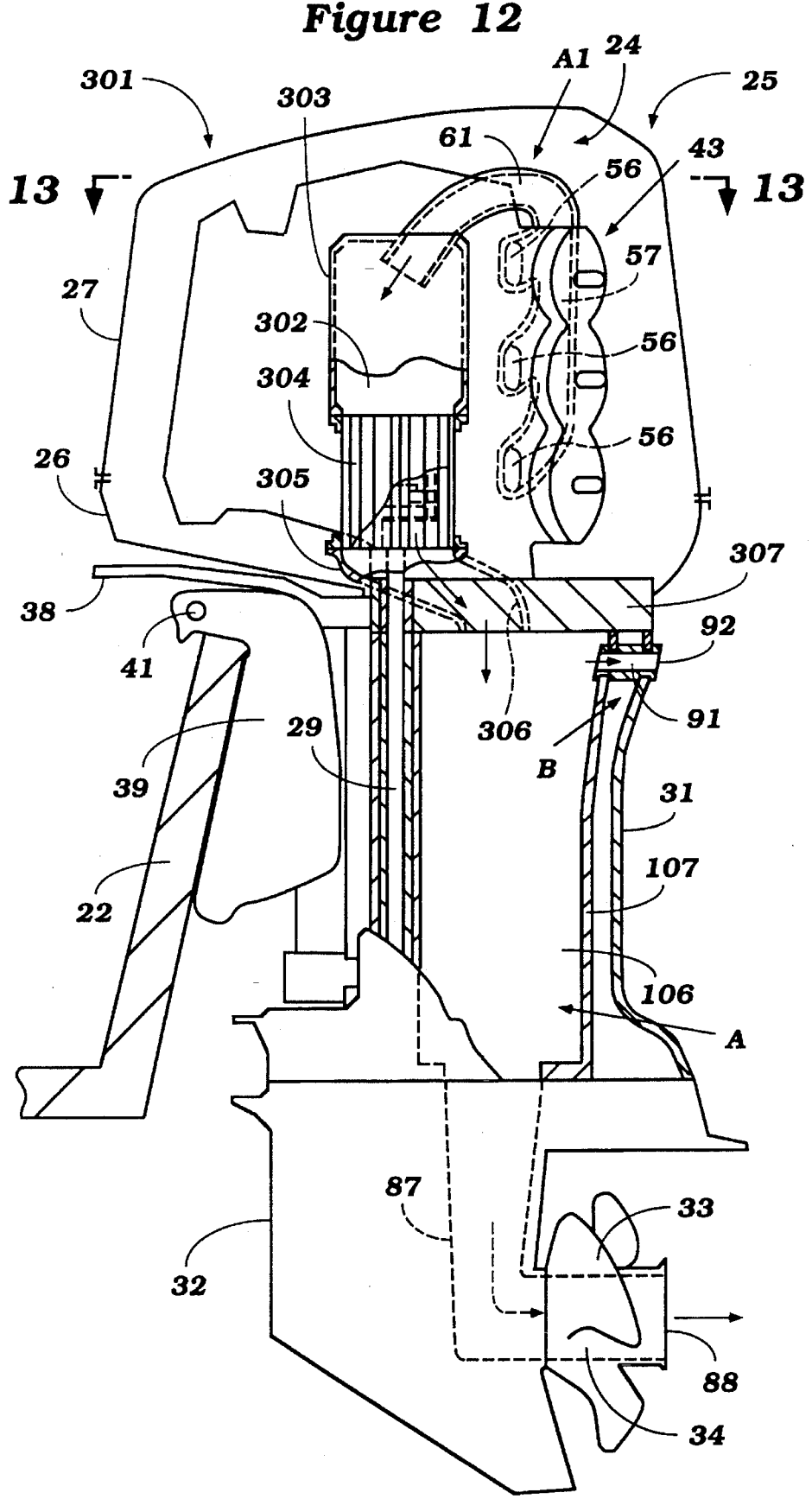
FIG. 12 is a side elevational view, in part similar to FIGS. 1, 4, 5, 6, 7, 8, and 9 and shows an eighth embodiment of the invention.
Figure 13:
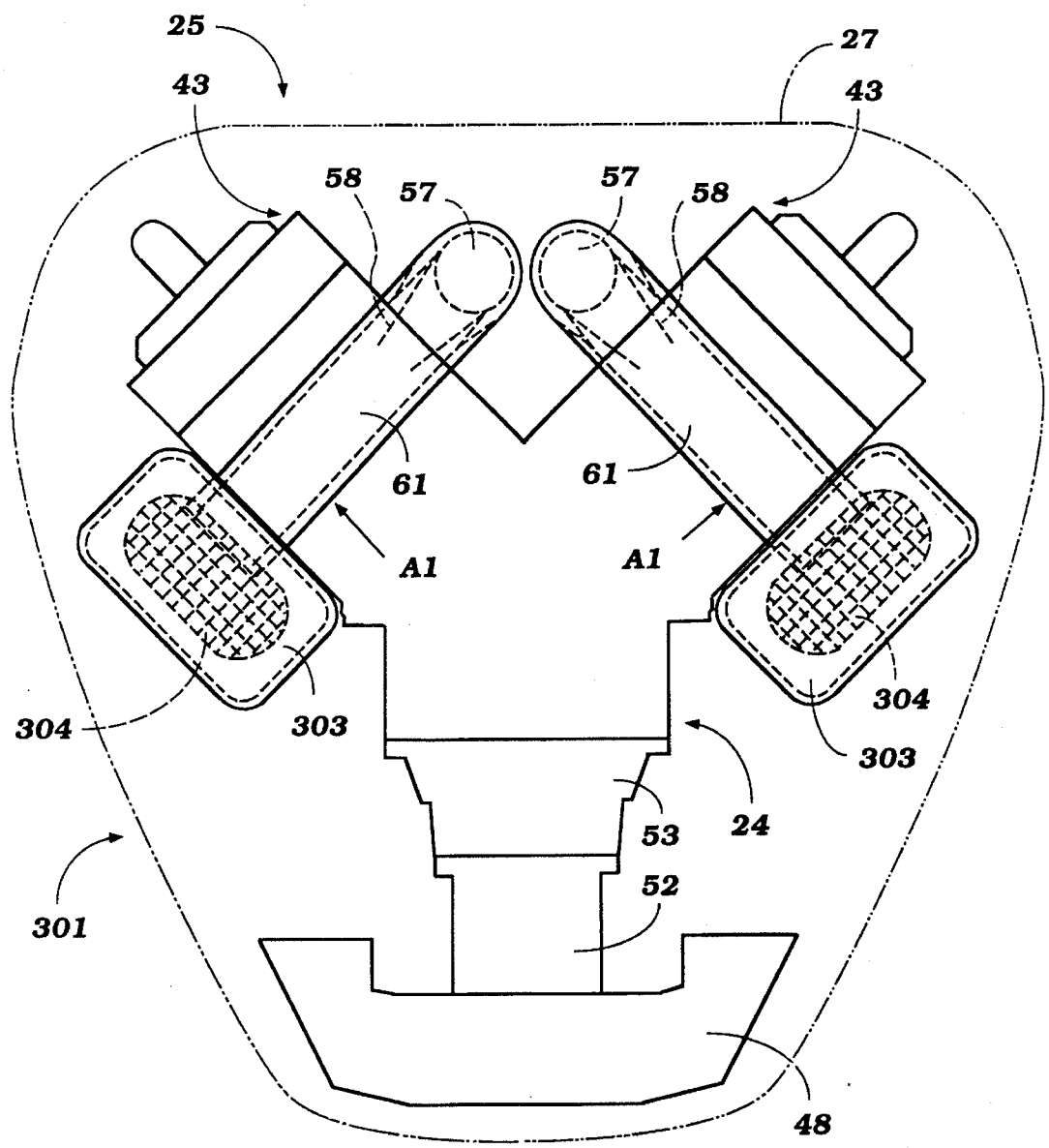
FIG. 13 is a cross-sectional view taken along the line 13—13 of FIG. 12 and on an enlarged scale.

FIGS. 12 and 13 show another embodiment of the invention as applied to an outboard motor, indicated generally by the reference numeral 301. In this embodiment, the exhaust ports 56 are disposed in the valley between the cylinder banks and the expansion chambers are disposed on the sides of the engine. Aside from these differences, the construction of the outboard motor 301 is generally the same as the embodiments previously described and, for that reason, components which are the same or substantially the same have been identified by the same reference numerals and will be described again only insofar as is necessary to understand the construction and operation of this embodiment.

In this embodiment, the exhaust ports 56 are disposed in the valley between the cylinder banks 43 and the trap section 61 extend across the upper ends of the cylinder banks and hence are disposed at a relatively high area. On each side of the cylinder block 42 there is provided a respective expansion chamber 302 formed by an expansion chamber forming member 303 into which the respective trap section A1 extends. The expansion chamber forming members 303 are supported on the upper side of a catalyst bed 304 which, in turn, is supported on a catalyst support and exhaust gas passage forming member 305. These members 305 then extend downwardly and communicate with exhaust passages 306 formed in the spacer plate 307 upon which the engine 24 is supported. The exhaust gases then enter the expansion chamber 106 of the drive shaft housing as with the previously described embodiments. Thus, like the previously described embodiments, the trap sections A1 are disposed at a high level and above the exhaust ports 56 so as to ensure that exhaust gases will not enter the engine through these exhaust ports 56.

Figure 14:
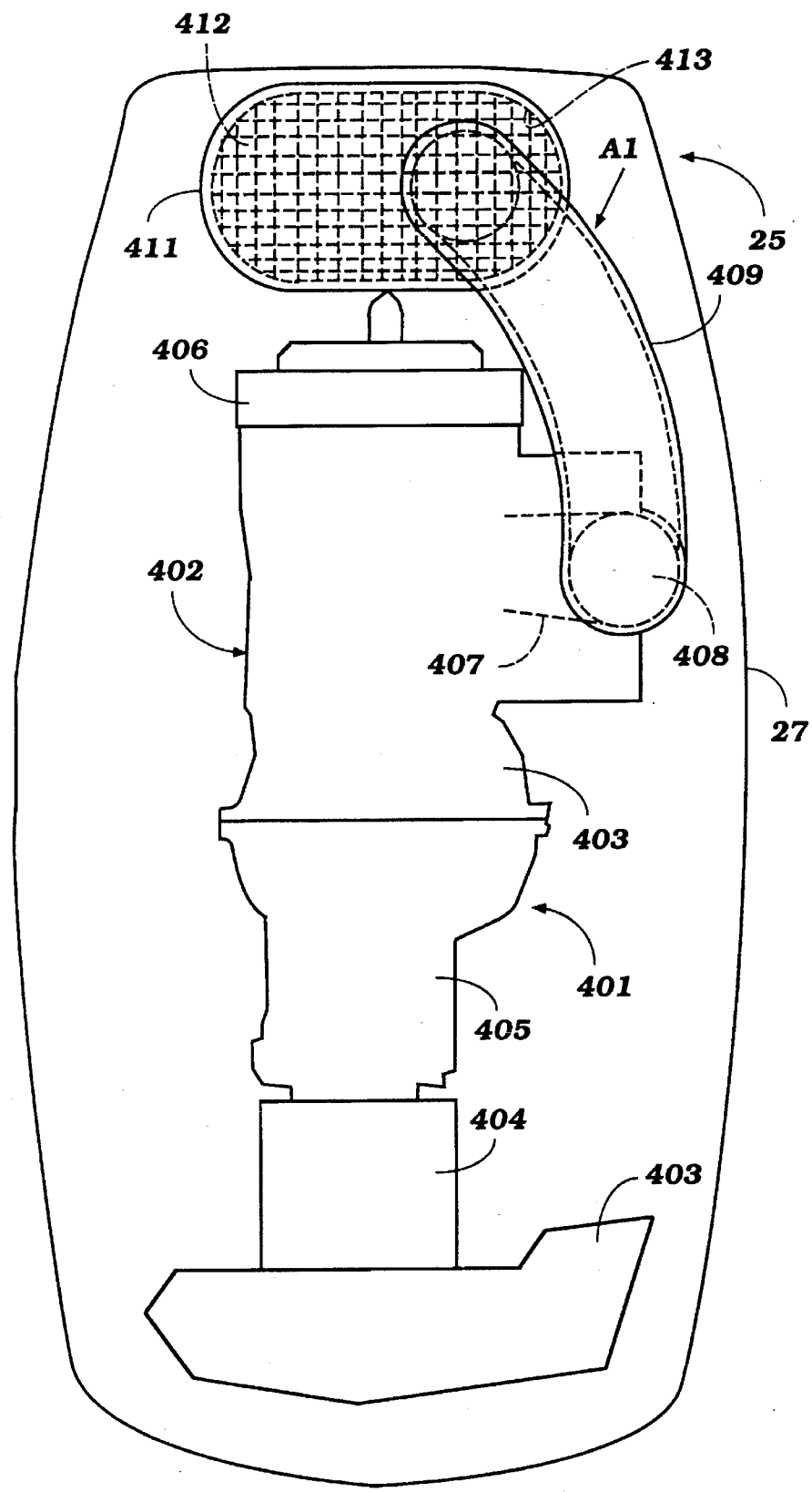
FIG. 14 is a top plan view of a ninth embodiment of the invention.

The embodiments of the invention as thus far described have all been used in conjunction with V type engines. It has been noted, however, that the invention may be equally as well practiced with in-line type of engines and such an embodiment is shown in FIG. 14 wherein an in-line type of engine 401 is disposed in the protective cowling 25 which is appropriately shaped so as to accommodate this type of engine. The engine 401 has a cylinder block 402 which defines a crankcase chamber 403 and which the engine crankshaft is rotated.

An intake charge is delivered to the individual crankcase chambers from an induction system that improves an air inlet device 403 that draws atmospheric air from the interior of the protective cowling 25 and delivers it to charge formers 404. The charge formers 404 in turn cooperate with an intake manifold 405 in which reed-type valve assemblies are provided so as to deliver the charge to the crankcase chambers of the engine.

A cylinder head assembly 406 is affixed to the end of the cylinder block 402 opposite the induction system.

Exhaust ports 407 which are vertically aligned depending upon the number of cylinders transfer the exhaust gases through one side of the cylinder block 402 to an exhaust manifold 408 which may be formed integrally with the cylinder block 402.

The exhaust gases then pass through a trap section 409 of a trap device A1 that extends vertically above the uppermost exhaust port 407.

The exhaust gases are then delivered to an expansion chamber device 411 which contains a catalyst bed 412 suspended in any manner so as to permit ease of replacement. This catalyst bed 412 has an outer shell that is received in a pocket 413 which has an exhaust gas discharge port (not shown) that extends downwardly into the expansion chamber of the drive shaft housing through an appropriate passage in the spacer plate.

It should be readily apparent from the foregoing description that the described embodiments of the invention provide a very effective exhaust system for an outboard motor wherein the exhaust pipes of the engine do not extend into the expansion chamber in the drive shaft housing and wherein trap sections are provided to extend above the uppermost exhaust port so as to ensure that water cannot enter the engine through its exhaust port. Of course, the foregoing description is that of the preferred embodiments of the invention and various changes and modifications may be made without departing from the spirit and scope of the invention, as defined by the appended claims.

We claim:

1. An outboard motor comprised of a power head having an internal combustion engine having at least one exhaust port and a surrounding protective cowling and a drive shaft housing and lower unit depending from said power head and containing a propulsion device driven by said engine, an underwater exhaust gas discharge for discharging exhaust gases to the atmosphere beneath a body of water in which the associated watercraft is operating, and means for delivering exhaust gases to said underwater exhaust gas discharge from said exhaust port comprising a section extending vertically above the highest exhaust port of said engine for forming a trap to preclude water from entering said exhaust ports from said underwater exhaust gas discharge.

2. The outboard motor of claim 1, wherein the engine has a plurality of cylinders and a plurality of exhaust ports.

3. The outboard motor of claim 2, wherein the cylinders are arranged in a vertically spaced orientation with the exhaust ports being vertically spaced from each other.

4. The outboard motor of claim 3, wherein the engine has a pair of cylinder banks each having at least two cylinders and respective exhaust ports.

5. The outboard motor of claim 4, wherein the exhaust conduit comprises a pair of trap sections, one for each of the cylinder banks.

6. The outboard motor of claim 1, wherein the exhaust conduit means further comprises an expansion chamber for expansion and silencing of the exhaust gases from the exhaust ports.

7. The outboard motor of claim 6, wherein the expansion chamber is formed in the drive shaft housing and lower unit.

8. The outboard motor of claim 7, wherein the engine has a plurality of cylinders and a plurality of exhaust ports.

9. The outboard motor of claim 8, wherein the cylinders are arranged in a vertically spaced orientation with the exhaust ports being vertically spaced from each other.

10. The outboard motor of claim 9, wherein the engine has a pair of cylinder banks each having at least two cylinders and respective exhaust ports.

11. The outboard motor of claim 10, wherein the exhaust conduit comprises a pair of trap sections, one for each of the cylinder banks.

12. The outboard motor of claim 7, further including an expansion chamber formed in the power head and to which the exhaust gases are delivered from the trap.

13. The outboard motor of claim 12, wherein the expansion chamber in the power head is disposed to the rear of the engine.

14. The outboard motor of claim 12, wherein the expansion chamber in the power head is disposed to the front of the engine.

15. The outboard motor of claim 6, wherein the expansion chamber is provided within the power head.

16. The outboard motor of claim 15, wherein the expansion chamber in the power head is disposed to the rear of the engine.

17. The outboard motor of claim 15, wherein the expansion chamber in the power head is disposed to the front of the engine.

18. The outboard motor of claim 15, wherein the engine has a plurality of cylinders and a plurality of exhaust ports.

19. The outboard motor of claim 18, wherein the cylinders are arranged in a vertically spaced orientation with the exhaust ports being vertically spaced from each other.

20. The outboard motor of claim 19, wherein the engine has a pair of cylinder banks each having at least two cylinders and respective exhaust ports.

21. The outboard motor of claim 20, wherein the exhaust conduit comprises a pair of trap sections, one for each of the cylinder banks.

22. The outboard motor of claim 1, further including a catalyst positioned in the exhaust conduit for catalytic treating of the exhaust gases.

23. The outboard motor of claim 22, wherein the catalyst is positioned in the trap.

24. The outboard motor of claim 22, wherein the catalyst is positioned in the power head within the protective cowling.

25. The outboard motor of claim 24, wherein the catalyst is positioned in the trap.

26. The outboard motor of claim 24, further including an expansion chamber and wherein the catalyst bed is disposed so as to treat the exhaust gases flowing to the expansion chamber.

27. The outboard motor of claim 26, wherein the expansion chamber is provided in the power head and surrounded by the protective cowling.

28. The outboard motor of claim 27, wherein the catalyst bed is disposed at an exit of the exhaust gases from the expansion chamber.

29. The outboard motor of claim 28, wherein the engine is supported upon a spacer plate interposed between the power head and the drive shaft housing and the spacer plate has an exhaust passage formed therein for delivering exhaust gases to the underwater exhaust gas discharge.

30. The outboard motor of claim 29, wherein the catalyst bed is positioned within the spacer plate exhaust passage.

31. The outboard motor of claim 29, wherein the catalyst bed is disposed adjacent the spacer plate and above the spacer plate.

32. The outboard motor of claim 29, wherein the catalyst bed is disposed within the expansion chamber.

33. The outboard motor of claim 32, wherein the catalyst bed is disposed above the lower end of the expansion chamber.

34. The outboard motor of claim 33, wherein the catalyst bed is disposed in a tubular extension that extends upwardly from the expansion chamber exit into the interior of the expansion chamber.

35. The outboard motor of claim 27, wherein the catalyst bed is disposed in the inlet to the expansion chamber.

36. The outboard motor of claim 24, wherein the expansion chamber in the power head is disposed to the rear of the engine.

37. The outboard motor of claim 24, wherein the expansion chamber in the power head is disposed to the front of the engine.

38. The outboard motor of claim 24, wherein the expansion chamber is disposed to the side of the engine.

39. The outboard motor of claim 38, wherein the engine has a pair of cylinder banks each having at least two cylinders and respective exhaust ports.

40. The outboard motor of claim 39, wherein there are a pair of expansion chambers one on each side of the engine.

* * * * *